March 3, 1959  A. TRAINOR  2,876,142
PHOTO-ELECTRIC CELL
Filed Jan. 5, 1955
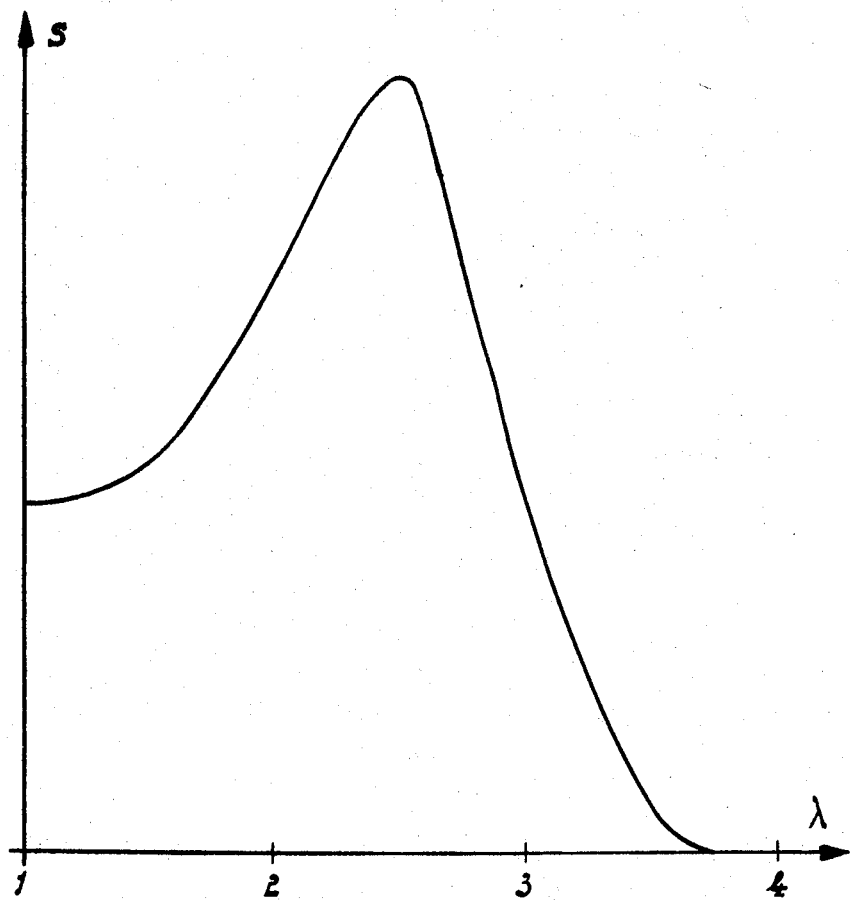
INVENTOR
Albert Trainor
BY
AGENT under# United States Patent Office 2,876,142
Patented Mar. 3, 1959

2,876,142
PHOTO-ELECTRIC CELL

Albert Trainor, Outwood, near Redhill, England, assignor, by mesne assignments, to North American Philips Company, Inc., New York, N. Y., a corporation of Delaware Application January 5, 1955, Serial No. 479,960

1 Claim. (Cl. 117—211)

This invention relates to photo-electric cells and methods of manufacturing photo-electric cells.

It is known to precipitate lead sulphide films having photo-electric sensitivity to infra-red radiation, by adding an aqueous solution of alkali-metal hydroxide to an aqueous solution of lead acetate in the presence of thiourea.

According to the present invention, a method of manufacturing a photo-electric cell comprises the step of adding an aqueous solution of alkali-metal hydroxide to an aqueous solution of lead acetate in the presence of thiourea and in the presence of hydrazine and/or a water-soluble hydrazine compound which does not precipitate the lead from the solution, such that a film exhibiting infra-red photo-electric sensitivity is precipitated onto a supporting surface provided in the solution.

Examples of suitable water-soluble compounds are hydrazine hydrate and phenylhydrazine.

The quantity of hydrazine or compound added may be as low as ½ mol. hydrazine/mol. lead acetate and as high as 7½ mol. hydrazine/mol. lead acetate, but a preferred range is from 2 to 3 mols. hydrazine/mol. lead acetate.

The support may be of glass and in this case increased sensitivity is obtained if a ground-glass surface is provided.

The sensitivity of a photo-electric cell manufactured by the method according to the invention may be improved by low-temperature baking of the support and the film, for example, at temperatures between 70° C. and 120° C.

Compounds which are not suitable are hydrazine hydrochloride and hydrazine sulphate, which themselves precipitate a lead salt and hence interfere with the action of the alkali-metal hydroxide.

The invention is not limited to a theoretical explanation of the effect of the hydrazine and/or compound but it may be that a reducing action gives rise to the deposition of the lead-excess material with n-type impurity centres. X-ray analysis has shown deposited layers to be pure lead sulphide (within the limits of the method of analysis) the lattice constant $a$ being equal to 5.940 A.

One example of the method according to the invention will now be given.

6 cc. of a solution of 20 g. of thiourea in one litre of distilled water are mixed with 3 cc. of a solution of 400 g. of lead acetate in one litre of distilled water and to the 9 cc. of mixture 0.7 g. of hydrazine hydrate solution (60% by weight) is added. After stirring for five minutes with the liquid in contact with a ground-glass surface to be coated (previously provided with electrodes of colloidal graphite) dipped into the solution 0.2 cc. of a solution of 666 g. of sodium hydroxide in one litre of distilled water is added and one minute later a further 0.8 cc. of the sodium hydroxide solution is added. The glass surface is then left in contact with the reaction mixture for a further nine minutes, the reaction mixture being stirred continuously. The cell is then removed and washed in 1% ammonium sulphide solution for ten minutes, washed in distilled water and dried on filter paper.

The cell was then baked in air at 90° C. for sixteen hours.

The accompanying drawing shows the spectral response of a typical cell, the signal S in arbitrary units being plotted against wavelength in microns.

100 volts was applied across a load consisting of a cell, having an active surface 6 mms. by 6 mms., and a 1 MΩ resistor and the cell was illuminated from a radiation source approximating a black body at 200° C., having a 3 mm. aperture, arranged at a distance of 20 cms. from the cell and the radiation being chopped at 800 c./sec.; the cell noise was found to vary from 1 to 5 microvolts and the signal/noise ratio variation was from 20/1 to 40/1. The internal resistance of the cells varied from 0.1 to 1 MΩ. The cell characteristics were, however, well reproducible from cell to cell, for example, the internal resistance was usually about 0.5 mΩ.

What is claimed is:

In a photoelectric cell, a support surface having a photosensitive coating, said coating being formed by adding an aqueous solution of an alkali-metal hydroxide to an aqueous solution of lead acetate in the presence of thiourea and a water soluble hydrazine compound incapable of precipitating lead from the solution to thereby precipitate substantially pure lead sulfide on to said support suspended in said lead acetate solution.

References Cited in the file of this patent

UNITED STATES PATENTS

| | | |
|---|---|---|
| 2,079,690 | Grisdale | May 11, 1937 |
| 2,448,516 | Cashman | Sept. 7, 1948 |
| 2,570,245 | Junge | Oct. 9, 1951 |
| 2,614,944 | Lytle | Oct. 21, 1952 |
| 2,617,741 | Lytle | Nov. 11, 1952 |
| 2,648,754 | Lytle | Aug. 11, 1953 |
| 2,659,682 | Anderson | Nov. 17, 1953 |